United States Patent [19]

Kubo

[11] Patent Number: 4,630,980
[45] Date of Patent: Dec. 23, 1986

[54] CHUCK ASSEMBLY FOR A MACHINE TOOL
[75] Inventor: Haruaki Kubo, Osaka, Japan
[73] Assignee: Dai Showa Seiki Kabushiki Kaisha, Osaka, Japan
[21] Appl. No.: 722,819
[22] Filed: Apr. 12, 1985
[30] Foreign Application Priority Data
  Jun. 29, 1984 [JP] Japan ............... 59-99419[U]
[51] Int. Cl.⁴ ............................................. B23B 31/04
[52] U.S. Cl. .................... 409/234; 279/1 N; 279/1 TS; 279/101; 279/103; 408/239 R
[58] Field of Search ............ 279/1 B, 1 N, 1 ME, 279/83, 86, 96, 97, 101, 102, 103, 1 T, 1 TS, 9 R, 9 A, 99, 47, 48; 408/239 R, 239 A; 409/232, 234

[56] References Cited
U.S. PATENT DOCUMENTS

| | | | |
|---|---|---|---|
| 1,047,466 | 12/1912 | Wagner | 279/86 X |
| 2,118,485 | 5/1938 | Brown | 279/9 A |
| 2,709,600 | 5/1955 | Lehde | 408/239 R X |
| 2,816,770 | 12/1957 | Vlieg et al. | 279/97 |
| 3,091,474 | 5/1963 | Boutros et al. | 279/97 |
| 3,444,781 | 5/1969 | Sunderman et al. | 279/9 R X |
| 3,630,534 | 12/1971 | Better | 279/102 X |
| 3,734,517 | 5/1973 | Benjamin | 279/1 B X |
| 3,789,472 | 2/1975 | Pegand | 279/1 ME X |
| 3,894,743 | 7/1975 | Hiroumi | 279/1 ME X |
| 4,021,051 | 5/1977 | Toyomoto et al. | 279/1 N |
| 4,062,552 | 12/1977 | Kitaguchi | 279/1 TS |
| 4,379,667 | 4/1983 | Yoshimoto et al. | 408/239 R |

FOREIGN PATENT DOCUMENTS

| | | | |
|---|---|---|---|
| 4423894 | 8/1969 | Japan | 279/1 N |
| 0184610 | 11/1982 | Japan | 279/1 N |
| 1068657 | 5/1967 | United Kingdom | 279/101 |

Primary Examiner—Gil Weidenfeld
Assistant Examiner—Glenn L. Webb
Attorney, Agent, or Firm—Koda and Androlia

[57] ABSTRACT

A chuck assembly for use in a machine tool for holding a tool element comprises a chuck body having a sleeve integrally formed therewith so as to extend in the direction, which sleeve has a support bore defined therein for the receipt and support of the tool element and also has its outer peripheral surface tapered in a direction away from the chuck body, a fastening nut having its inner peripheral surface tapered in complemental relation to the outer peripheral surface of the sleeve and helically rotatably mounted on the sleeve through a plurality of roll bearings, and a reinforcing nut threadingly mounted on the fastening nut and adapted to be engaged under pressure with the chuck body when the fastening nut has been fastened and the reinforcing nut is then fastened.

9 Claims, 9 Drawing Figures

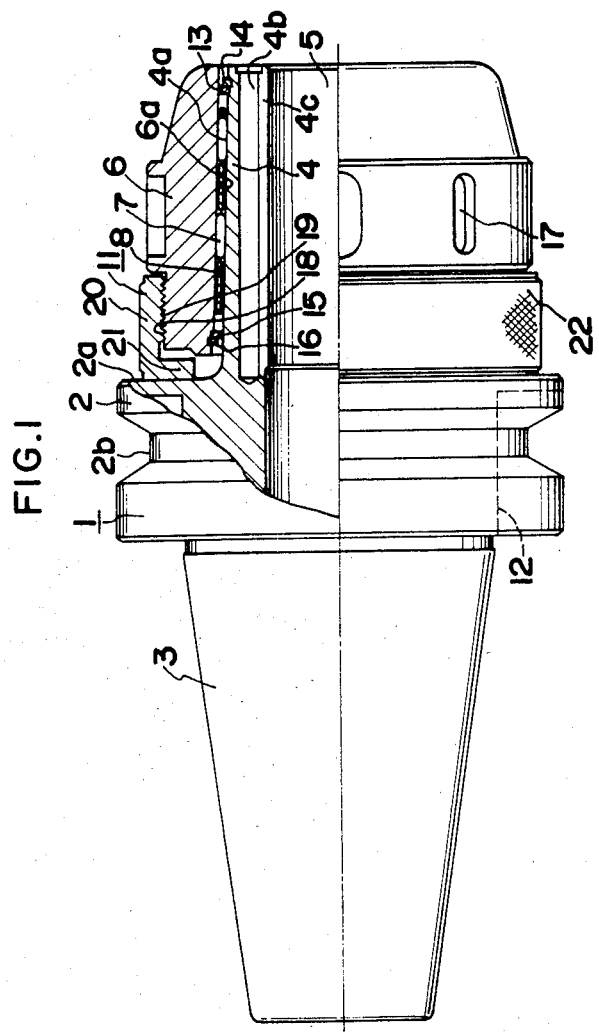

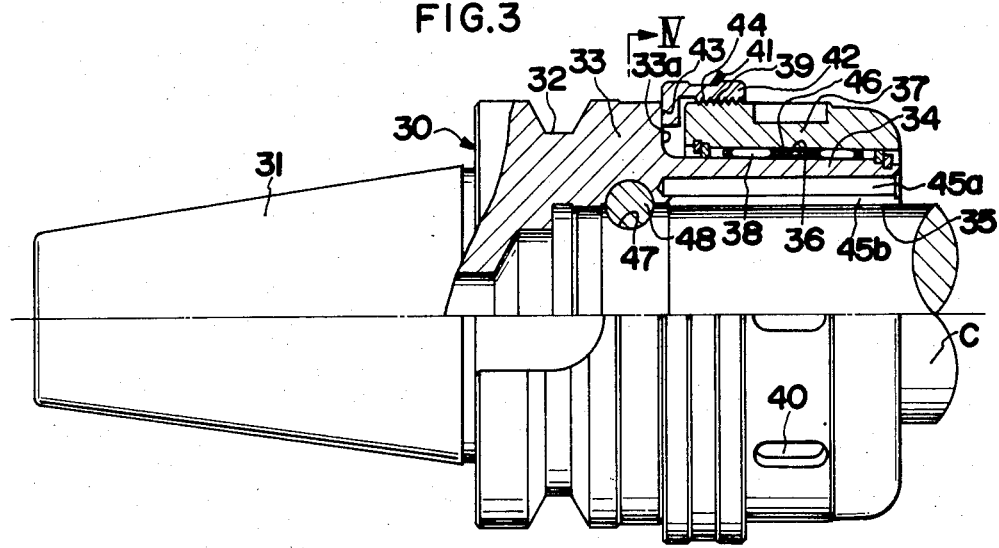
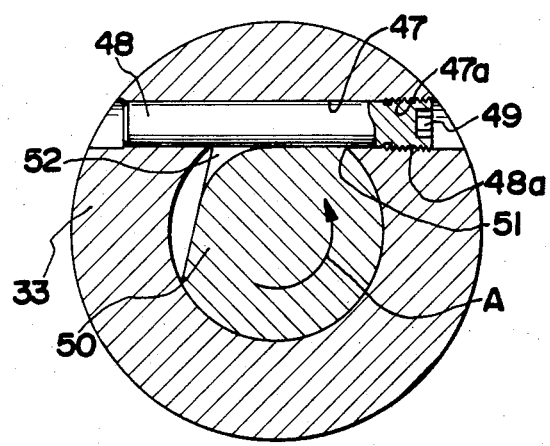
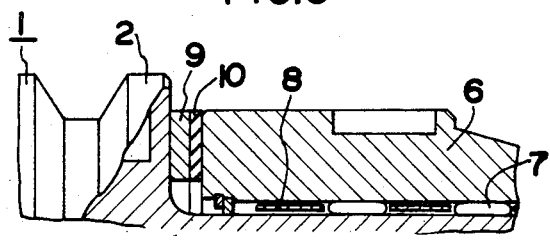

CHUCK ASSEMBLY FOR A MACHINE TOOL

BACKGROUND OF THE INVENTION

The present invention generally relates to a machine tool such as, for example, a drill or an end milling machine and, more particularly, to a chuck assembly for the machine tool for holding a tool, for example, a heavy-duty cutting tool.

A typical prior art chuck assembly of the type referred to above is disclosed in, for example, the Laid-open Utility Model Publications No. 58-143107 and no. 58-143108 both filed in Japan in the name of the same assignee of the present invention and first published in 1983. To sum up, the chuck assembly disclosed in any one of these publications may be considered corresponding to a chuck assembly according to the present invention from which an internally threaded reinforcement ring employed in accordance with the teachings of the present invention as shown in FIG. 1 of the accompanying drawings is eliminated.

For the purpose of the discussion of the prior art, the prior art chuck assembly will be described with the aid of FIG. 1 which illustrates a preferred embodiment of the present invention as will be described later. As shown, the prior art chuck assembly comprises a generally cylindrical body 1 having a radially outwardly protruding collar 2 and an axially outwardly tapering shank 3 formed integrally therewith and positioned on respective ends of the cylindrical body 1, and a sleeve 4 extending axially outwardly from one end of the cylindrical body 1 where the collar 2 is formed radially outwardly. The sleeve 4 is adapted to receive therein and support a tool element (not shown) such as, for example, a cutter or a drill, and for this purpose, takes a cross-sectional representation such as shown in any one of FIGS. 2(a), 2(b), 2(c), 2(d) and 2(e). In other words, the sleeve 4 takes a cross-sectional representation wherein the wall is rendered to have a relatively small thickness or is axially splined to provide circumferentially equidistantly spaced sleeve segments so that the sleeve 4 can be radially inwardly deformed or constricted to firmly chuck the tool element. The sleeve 4 has its outer peripheral surface 4a tapered in a direction axially away from the cylindrical body 1 and has a fastening ring or nut 6 rotatably mounted thereon, said fastening nut 6 having its inner peripheral surface tapered in complementary relation to the inner peripheral surface 4a of the sleeve 4.

A plurality of roll bearings 7, each comprised of a roller retainer 8 retaining non-detachably, but loosely a plurality of, for example, two needle rolls, are circumferentially disposed between the outer peripheral surface of the sleeve 4 and the inner peripheral surface of the fastening nut 6 with the longitudinal axis of each of the needle rolls extending in inclined relation to the generatrix of the tapering of any one of the inner and outer peripheral surface of the fastening nut 6 and the sleeve 4, respectively. Accordingly, as the fastening nut 6 is rotated in one direction about the sleeve 4, that is, the longitudinal sense of the chuck assembly, the fastening nut 6 can be axially moved in one direction, for example, towards the cylindrical body 1 together with the roll bearings 7 to cause the sleeve 4 to be radially inwardly deformed or constricted with a support bore 5 consequently reduced in its diameter to firmly chuck the tool element. This is possible because the outer peripheral surface 4a of the sleeve 4 and the inner peripheral surface of the fastening nut 6 are so shaped as to be complementary with each other and are so tapered that, when the fastening nut 6 is axially moved leftwards as viewed in FIG. 1 by turning it around the sleeve 4, the free end portion of the sleeve 4 remote from the cylindrical body 1 can be radially inwardly yielded to reduce the diameter of the support bore 5 for the receipt of the tool element, thereby firmly chucking the tool element then inserted in the support bore 5.

In this prior art chuck assembly of the construction described hereinabove, since the sleeve 4 is so formed as to have a considerably reduced wall thickness, it has been found that during the use of the chuck assembly in operation, the sleeve 4 tends to oscillate to produce a rattling sound, thereby hampering a precise machining operation.

In order to overcome the previously discussed problem, it can be contemplated to provide a chuck assembly wherein the sleeve having a considerably reduced wall thickness, the fastening nut mounted exteriorly on the sleeve, and a portion of the cylindrical body, for example, the collar having a wall of greater thickness can be integrally rotated together during the use of the chuck assembly in operation. Another conventional chuck assembly embodying this concept is shown in FIG. 5.

According to the prior art shown in FIG. 5, the collar 2 is integrally formed with an annular projection 9 protruding towards the fastening nut 6 and has an annular hard rubber lining 10 secured to the annular end face of the projection 9 such that, when the fastening nut 6 is fastened while axially moved leftwards, the annular end face of the fastening nut 6 adjacent the hard rubber lining 10 can be brought into contact with the annular hard rubber lining 10 with the hard rubber lining 10 consequently compressed to permit the sleeve, the fastening nut and the collar to be integrated together.

However, the prior art chuck assembly which utilized the rubber lining has a drawback in that the amount of deformation of the rubber lining incident to the internal compression resulting from the engagement of the fastening nut is so limited that the fastening nut when fastened cannot be firmly coupled with the cylindrical body. In other words, depending on the type of the tool element, the outer diameter of the shank is smaller than the internal diameter of the sleeve and, therefore, in order for the tool element to be firmly chucked, the extent to which the sleeve should be radially inwardly deformed or constricted for the purpose of firmly chucking the tool element must be sufficiently great. However, with the prior art chuck assembly utilizing the rubber lining to which the fastening nut 6 is brought into engagement under pressure when the fastening nut 6 is fastened, the rubber lining 10 cannot be sufficiently internally compressed to firmly chuck the tool element.

SUMMARY OF THE INVENTION

Accordingly, the present invention has been developed with a view to substantially eliminating the above described problems inherent in the prior art chuck assemblies discussed above and has for its essential object to provide an improved chuck assembly wherein the sleeve is permitted to resiliently deform to reduce its internal diameter for firmly chucking the tool element and, when and so long as the chuck assembly is in use, the thin-walled sleeve can be integrated together with the fastening nut and the cylindrical body to provide a substantially unitary structure with a rigidity of the sleeve substantially increased.

Another important object of the present invention is to provide an improved chuck assembly of the type referred to above, wherein means for imparting the rigidity to the sleeve is constituted by a reinforcing ring or nut and is manufactured in a size sufficiently compact enough to prevent the reinforcing ring or nut, when mounted on the cylindrical body from protruding radially outwardly from the cylindrical body.

A further object of the present invention is to provide an improved chuck assembly of the type referred to above, wherein the rigidity imparting means is, during the rotation of the chuck assembly, fastened, rather than being loosened, to firmly connect the sleeve to the cylindrical body.

A still further object of the present invention is to provide an improved chuck assembly of the type referred to above, wherein no unreasonably great torque is required to fasten the rigidity imparting means at the time of the initial fastening thereof.

In the case of the end-milling work, since a relatively great cutting torque acts as a load on the cutting element and also the chuck assembly holding such cutting element, a first locking means for firmly holding the cutting element for the end milling operation with no vibration induced and a second locking means for locking the cutting element without permitting the cutting element to undergo a slip motion in a direction of rotation of the chuck assembly and also without permitting the cutting element to separate from the chuck assembly are required.

Accordingly, a still further object of the present invention is to provide an improved chuck assembly of the type referred to above, which can be applied as a chuck assembly of double lock system (combination lock holder).

In order to accomplish these objects of the present invention, there is provided the chuck assembly with a reinforcing ring or nut rotatably mounted on the fastening nut, which reinforcing ring or nut can, when rotated in one direction, be brought into firm engagement with an annular end face of the collar adjacent the sleeve to tightly couple the sleeve and the fastening nut together.

According to the present invention, with the provision of the reinforcing ring or nut, when the fastening nut is fastened while the reinforcing ring or nut is held in position spaced a distance axially away from the annular end face of the collar, any one of cutting elements or like tool elements of different diameter can be firmly chucked satisfactorily. The subsequent fastening of the reinforcing ring or nut with the adjacent annular end thereof consequently firmly engaged to the annular end face of the collar causes the thin-walled sleeve to be firmly coupled with the fastening nut and the collar through the reinforcing ring or nut and, therefore, when the chuck assembly is in use, any possible undesirable oscillatory motion of the sleeve can be avoided advantageously.

BRIEF DESCRIPTION OF THE DRAWINGS

These and other objects and features of the present invention will become clear from the subsequent description of preferred embodiments of the present invention taken with reference to the accompanying drawings, in which:

FIG. 1 is a longitudinal sectional view of a chuck assembly according to a first preferred embodiment of the present invention;

FIG. 3 is a longitudinal sectional view of the chuck assembly according to another preferred embodiment of the present invention;

FIG. 4 is a cross sectional view taken along the line IV—IV in FIG. 3; and

FIG. 5 is a longitudinal sectional view of a portion of the prior art chuck assembly, reference to which has been made hereinbefore.

DETAILED DESCRIPTION OF THE PREFERRED EMBODIMENTS

Figure 2A:
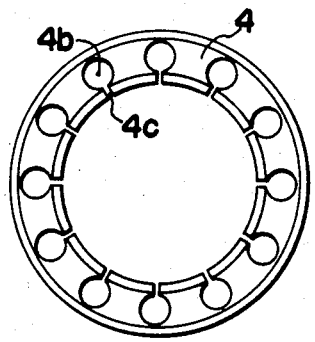
FIGS. 2(a) to 2(e) are diagrams showing different cross sectional representations of various sleeves which may be employed in the chuck assembly of the present invention.
Figure 2B:
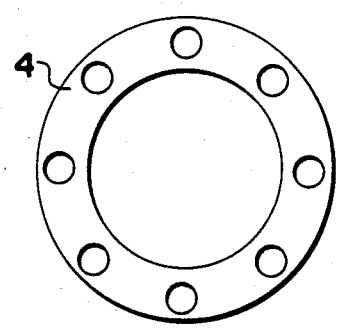
Figure 2C:
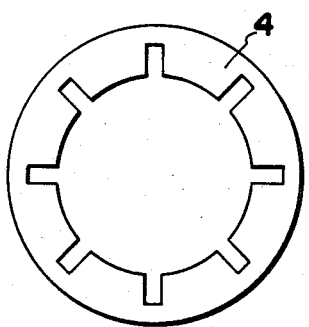
Figure 2D:
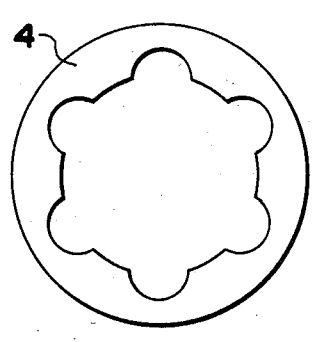
Figure 2E:
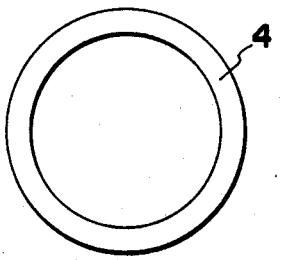

Referring first to FIG. 1, a chuck assembly according to the present invention including a generally cylindrical body 1, a collar 2, a shank 3 and a sleeve 4 is of a construction generally identical with that of the first discussed prior art chuck assembly and, accordingly, the details not mentioned in the description of the first discussed prior art chuck assembly will be described. The cylindrical body 1 has a circumferentially extending, radially inwardly recessed groove 2b defined therein for engagement with a manipulator arm (not shown) built in an automatic machine tool and operable to replace the chuck assembly with another chuck assembly. The cylindrical body 1 also has a positioning recess 12 defined therein so as to radially inwardly extend, which recess 12 is utilized for the alignment of the chuck assembly with a machine spindle (not shown). So far shown, the sleeve 4 has a plurality of axially extending circular-sectioned holes 4b spaced an equal distance from each other about the longitudinl axis of the sleeve 4, which holes 4b are communicated with a support bore 5 in the sleeve 4 through respective axially extending slits 4c as shown in FIG. 2(a) so that, when the fastening ring or nut 6 is fastened, the diameter of the support bore 5 can be reduced. It is, however, to be noted that the cross-sectional representation of the sleeve 4 may not be always limited to that shown in FIG. 2(a), but may be the one shown in any one of FIGS. 2(b) to 2(e) as is the case with the prior art. Of these examples shown in FIGS. 2(a) to 2(e), the example shown in FIG. 2(e) illustrates that the sleeve 4 has a relatively small wall thickness over the entire circumference thereof.

At one end of the sleeve 4 remote from the collar 2, a seal ring 13 and a stopper ring 14 are mounted on the outer peripheral surface of the sleeve 4 and, similarly, at one end of the fastening nut 6 adjacent the collar 2, a seal ring 15 and a stopper ring 16 are secured to the inner peripheral surface of the fastening nut 6, for the purpose of avoiding any possible separation of the fastening nut 6 from the sleeve 4 and also any possible separation of the roll bearings 7 and the retainers 8 from a gap between the inner peripheral surface of the fastening nut 6 and the outer peripheral surface of the sleeve 4.

The fastening nut 6 has its substantially intermediate portion formed with a plurality of circumferentially equidistantly spaced engagement slots 17 for engagement with a tool (not shown) used to turn the fastening nut 6 around the sleeve 4 for fastening and undoing the fastening nut 6. The fastening nut 6 also has a male thread 18 defined at the outer peripheral surface of one end portion thereof adjacent the collar 2 for engagement with a female thread 19 defined in a reinforcing ring or nut 11 which will now be described.

The reinforcing ring or nut 11 comprises a generally cylindrical barrel 20 having its inner peripheral surface formed with the female thread 19 and a contact flange 21 extending radially inwardly from one end of the cylindrical barrel 20 adjacent the collar 2. This reinforcing nut 11 is threadingly mounted on the fastening nut 6 with the female thread 19 engaged with the male thread 18. The female thread 19 defined in the inner peripheral surface of the cylindrical barrel 20 is so positioned that, even after the fastening nut 6 has been fastened to a fastening position, the reinforcing nut 11 can be screwed until the radially inwardly extending flange 21 abuts the annular end face 2a of the collar 2. Accordingly, it will readily be seen that, after the tool element has been inserted into the support bore 5 and the fastening nut 6 has subsequently been fastened to firmly chuck the tool element inserted into the support bore 5 by the use of the fastening tool (not shown) engaged in the engagement slots 17, the reinforcing nut 11 is turned around the fastening nut 6 until the radially inwardly extending contact flange 21 firmly abuts the annular end face 2a of the collar 2 thereby tightly coupling the fastening nut 6 to the collar 2 and, hence, the cylindrical chuck body 1. The required turn of the reinforcing nut 11 can be effected manually and, for this purpose, the outer peripheral surface of the cylindrical barrel 20 is knurled as shown by 22 to avoid any possible slip between the attendant worker's fingers and the reinforcing nut 11.

Preferably, the male and female threads 18 and 19 are so designed that the direction of fastening of the reinforcing nut 11 required to cause the contact flange 21 to firmly engage the annular end face 2a of the collar 2 can be opposite to the direction of rotation of the spindle of the machine tool to which the chuck assembly is coupled, that is, opposite to the direction of rotation of the chuck assembly caused by the rotation of the machine spindle. With this design, it is possible to avoid the undesirable loosening of the reinforcing nut 11 under the influence of vibrations produced by the machine tool being operated. In other words, during the rotation of the machine spindle and, hence, the chuck assembly in one direction, the reinforcing nut 11 is imparted with a tendency to turn in the fastening direction which is counter to the direction of rotation of the chuck assembly. Accordingly, in order to fasten the reinforcing nut 11 subsequent to the fastening of the fastening nut 6, no unreasonably great torque is required.

Referring now to FIGS. 3 and 4 which show another preferred embodiment of the present invention, the chuck assembly shown therein comprises a generally cylindrical chuck body 30 having one end integrally formed with a shank 31 extending axially thereof so as to taper in a direction away from the cylindrical body 30. The cylindrical body 30 is formed at its substantially intermediate portion thereof with a radially inwardly recessed, circumferentially extending groove 32 for engagement with the manipulator arm (not shown) when the chuck assembly is to be replaced with another chuck assembly, the other end portion of the cylindrical body 30 on one side of the groove 32 opposite to the shank 31 being formed into a collar 33. The cylindrical body 30 also has a sleeve 34 integrally formed with the collar 33 so as to coaxially extend therefrom in a direction opposite to the shank 31 and having a support bore 35 defined therein for the receipt of a tool element. The outer peripheral surface of the sleeve 34 is tapered in a direction away from the collar 33 as shown by 36.

A fastening ring or nut 37 having its inner peripheral surface tapered in complementary relation to the tapered out peripheral surface 36 of the sleeve 34 is rotatably mounted on the sleeve 34 with a plurality of roll bearings 38 and retainer 46 operatively interposed between the inner peripheral surface of the reinforcing nut 37 and the outer peripheral surface of the sleeve 34 in a manner similar to the roll bearings 7 and retainer 8 described in connection with the foregoing embodiment of FIG. 1, it being to be noted that each of the roll bearings 7 and retainer 8 is of identical construction with, and is arranged in a manner similar to, the roll bearing 7 and retainer 8 described with reference to FIG. 1. The fastening nut 37 has a male thread 39 defined on the outer peripheral surface thereof at one end adjacent the collar 33 and also has defined on the outer peripheral surface thereof a plurality of engagement slots 40 for engagement with a tool (not shown) used to turn the fastening nut 37 around the sleeve 34 for fastening and undoing the fastening nut 37 selectively.

A reinforcing ring or nut 41 comprising a cylindrical barrel 42 and a radially inwardly extending contact flange 43 has a female thread 44 defined in the inner peripheral surface of the cylindrical barrel 42 and is threadingly mounted on the fastening nut 37 with the female thread 44 engaged with the male thread 39 and with the contact flange 43 adapted to be engaged with an annular end face 33a of the collar 33.

So far shown in FIG. 3, the sleeve 34 has a plurality of axially extending circular-sectioned holes 45a spaced an equal distance from each other about the longitudinal axis of the sleeve 34, which holes 45a are communicated with the support bore 35 through respective axially extending slits 45b, substantially as shown in FIG. 2(a). Thus, it will readily be seen that, with the holes 45a and the slits 45b so defined in the sleeve 34, the sleeve 34 has thin-walled portions and thick-walled portions which are alternating relative to each other in a direction circumferentially of the sleeve 34.

The structure and the operation of the chuck assembly according to the embodiment shown in FIG. 3 are identical with those according to the foregoing embodiment shown in and described with reference to FIG. 1 and, therefore, they are not herein reinterated for the sake of brevity.

However, the chuck assembly according to the embodiment shown in FIG. 3 differs from that shown in and described with reference to FIG. 1 in the following respect.

As best shown in FIG. 4, the cylindrical body 30 has a transverse through-hole 47 defined therein so as to extend transversely thereof generally in a direction tangential to the periphery of the support bore 35. This transverse through-hole 47 has a substantially intermediate portion communicated with the support bore 35 and has one end internally threaded as at 47a. This through-hole 47 is adapted to receive therein a cotter pin 48 having one end exteriorly threaded as at 48a for engagement with the internal thread 47a of the through-hole 47, one end face of said cotter pin 48 adjacent the internal thread 48a being formed with a socket 49 which is adapted to receive, for example, a hexagonal wrench when the cotter pin 48 is desired to be screwed into the through-hole 47 to set the cotter pin 48 in position within the through-hole 47. The cotter pin 48 employed according to the pesent invention is in contrast to the prior art teaching in which a cotter pin is pressure-fitted.

In FIG. 4, reference numeral 50 represents a shank portion of the tool element C received in the support bore 35.

In the construction described above, when an excessive cutting torque acts during the cutting operation in a direction shown by the arrow A in FIG. 4, a cut face 51 of a lock groove 52 defined in the shank portion 50 of the cutting tool element C is firmly engaged with the cotter pin 48 to such an extent that, even if the fastening nut 37 is loosened, the shank portion 50 cannot be disengaged from the cotter pin 48. However, since the cotter pin 48 according to the embodiment of the present invention is threadedly engaged in the through-hole 47, the shank portion 50 can readily be disengaged from the cotter pin 48 merely by turning the cotter pin 48 by the use of the hexagonal wrench so as to move the cotter pin 48 in a direction rightwards as viewed in FIG. 4 to permit the shank portion 50 to be turned in a direction opposite to the direction shown by the arrow A, thereby disengaging the cut face 51 of the lock groove 52 from the peripheral face of the cotter pin 48. In this way, the firm engagement between the shank portion 50 and the cotter pin 48 can be loosened and, therefore, the removal of the tool element C from the chuck assembly can readily be facilitated.

The chuck assembly according to the embodimet shown in and described with reference to FIGS. 3 and 4 is advantageously used for chucking a heavy-duty cutting tool element such as used in an end-milling work. More specifically, the cutting element C can firmly be chucked by the thin-walled sleeve 45b by fastening the fastening nut 37 while any possible rotation of the cutting tool element C relative to the chuck assembly as well as any possible separation of the cutting tool element C from the chuck assembly can be avoided by the firm engagement of the shank portion of the cutting tool element with the cotter pin. The chuck assembly of the construction shown in and described with reference to FIGS. 3 and 4 is of a double-lock type and is advantageous in that the cutting tool element can be accurately coupled to the machine spindle through such chuck assembly.

Although the present invention has fully been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A chuck assembly for use in a machine tool for holding a tool element, which chuck assembly comprises a chuck body having a sleeve integrally formed therewith so as to protrude in one direction in alignment with the axis of rotation of the chuck assembly, said sleeve having a support bore defined therein for the receipt and support of the tool element, said sleeve also having its outer peripheral tapering surface in one direction away from the chuck body; a circumferentially extending, radially inwardly recessed engagement groove for engagement with a manipulator arm for the replacement of the chuck assembly with another chuck assembly defined in said chuck body; a fastening nut having its inner peripheral surface tapering in complementary relation to the tapered outer peripheral surface of the sleeve and rotatably mounted on said sleeve; a male screw thread provided on an outer peripheral surface of said fastening nut; a plurality of roll bearings interposed between the outer peripheral surface of the sleeve and the inner peripheral surface of the fastening nut thereby permitting the fastening nut to be helically rotated relative to the sleeve about the axis of rotation of the chuck assembly while moving axially of the sleeve; and a reinforcing nut having a cylindrical barrel, a contact flange extending inwardly in the radial direction from one end of said cylindrical barrel, and a female screw thread provided on an inner peripheral surface of the cylindrical barrel which is in rotatable engagement with the male screw thread provided on the outer peripheral surface of the fastening nut, the reinforcing nut is threadingly mounted on the fastening nut and the contact flange is adapted to be engaged under pressure with an annular end face of the chuck body by rotating the reinforcing nut when said fastening nut is fastened.

2. A chuck assembly as claimed in claim 1, wherein each of the roll bearings comprises a roll retainer and at least one needle roll rotatably retained by said retainer, said roll bearings being operatively interposed between the outer peripheral surface of the sleeve and the inner peripheral surface of the fastening nut with the respective longitudinal axes of said needle rolls inclined relative to the generatrix of the tapered outer peripheral surface of the sleeve.

3. A chuck assembly as claimed in claim 1, wherein the chuck body has a through-hole defined therein so as to extend in a direction generally tangential to the circle assumed by the cross-sectional shape of the support bore, said through-hole having a substantially intermediate portion communicated with the support bore, and further comprising a cotter pin threadably inserted in said through-hole with a substantially intermediate portion thereof exposed to the support bore through the intermediate portion of the through-hole for locking the tool element inserted in the support bore.

4. A chuck assembly as claimed in claim 3, wherein one end of said cotter pin has its peripheral surface formed with a helical thread, and one end of the through-hole adjacent said one end of the cotter pin has its peripheral surface formed with a mating helical thread, said cotter pin being threadingly inserted in said through-hole.

5. A chuck assembly as claimed in claim 2, wherein the chuck body has a through-hole defined therein so as to extend in a direction generally tangential to the circle assumed by the cross-sectional shape of the support bore, said through-hole having a substantially intermediate portion communicated with the support bore, and further comprising a cotter pin threadably inserted in said through-hole with a substantially intermediate portion thereof exposed to the support bore through the intermediate portion of the through-hole for locking the tool element inserted in the support bore.

6. A chuck assembly as claimed in claim 3, wherein one end of said cotter pin has its peripheral surface formed with a helical thread, and one end of the through-hole adjacent said one end of the cotter pin has its peripheral surface formed with a mating helical thread, said cotter pin being threadingly inserted in said through-hole.

7. A chuck assembly as claimed in claim 5, wherein one end of said cotter pin has its peripheral surface formed with a helical thread, and one end of the through-hole adjacent said one end of the cotter pin has its peripheral surface formed with a mating helical thread, said cotter pin being threadingly inserted in said through-hole.

8. A chuck assembly as claimed in claim 2, wherein the chuck body has a through-hole defined therein so as to extend in a direction generally tangential to the circle assumed by the cross-sectional shape of the support bore, said through-hole having a substantially intermediate portion communicated with the support bore, and further comprising a cotter pin threadably inserted in said through-hole with substantially intermediate portion thereof exposed to the support bore through the intermediate portion of the through-hole for locking the tool element inserted in the support bore.

9. A chuck assembly as claimed in claim 8, wherein one end of said cotter pin has its peripheral surface formed with a helical thread, and one end of the through-hole adjacent said one end of the cotter pin has its peripheral surface formed with a mating helical thread, said cotter pin being threadingly inserted in said through-hole.

* * * * *